United States Patent [19]

Ryburg et al.

[11] Patent Number: 4,852,500
[45] Date of Patent: Aug. 1, 1989

[54] INTEGRATED COMPUTER IMPLEMENT WORK AREA

[75] Inventors: Jon B. Ryburg; Neil Goldberg, both of Ann Arbor, Mich.

[73] Assignee: Herman Miller, Inc., Zeeland, Mich.

[21] Appl. No.: 27,611

[22] Filed: Mar. 18, 1987

[51] Int. Cl.⁴ .............................................. A47B 11/00
[52] U.S. Cl. ...................................... 108/105; 108/50; 312/208; 312/196; 312/195; 248/918; 248/919
[58] Field of Search ............... 108/105, 143, 141, 140, 108/139, 94, 95, 50, 64; 248/1 A, 1 B, 1 C-1 I, 639, 663, 662; 312/208, 196, 195, 194, 223

[56] References Cited

U.S. PATENT DOCUMENTS

| | | |
|---|---|---|
| 2,103,651 | 12/1937 | Thomas . |
| 2,230,444 | 2/1941 | Balster ................................ 312/208 |
| 2,717,699 | 9/1955 | Spindler et al. . |
| 2,724,923 | 11/1955 | Weir ................................ 108/105 X |
| 2,734,952 | 2/1956 | Austin . |
| 2,827,176 | 3/1958 | Ready, Jr. . |
| 3,048,461 | 8/1962 | Peterson . |
| 3,632,180 | 1/1972 | Hauville ............................ 312/209 |
| 3,844,633 | 10/1974 | Frederick ......................... 312/209 |
| 3,883,202 | 5/1975 | Konig ............................... 312/195 X |
| 3,908,565 | 9/1975 | Burnett ............................ 108/105 X |
| 3,964,401 | 6/1976 | Gutmann, Jr. et al. ............. 108/64 |
| 4,053,193 | 10/1977 | Grover et al. ................... 312/223 X |
| 4,090,754 | 5/1978 | Kavis ................................ 312/196 |
| 4,145,097 | 3/1979 | Naess et al. ..................... 312/208 X |
| 4,161,345 | 7/1979 | Begun .............................. 312/253 |
| 4,272,136 | 6/1981 | Sengua ............................. 312/196 |
| 4,323,291 | 4/1982 | Ball .................................. 312/196 X |
| 4,353,518 | 10/1982 | Taylor et al. .................... 312/223 X |
| 4,365,561 | 12/1982 | Tellier et al. ......................... 108/7 |
| 4,382,642 | 5/1983 | Burdick ............................ 312/194 |
| 4,433,884 | 2/1984 | Edwards et al. ................. 312/256 |
| 4,546,708 | 10/1985 | Wilburth ............................ 108/94 |
| 4,560,215 | 12/1985 | Turner ............................. 312/208 X |
| 4,561,619 | 12/1985 | Robillard et al. ............... 108/143 X |
| 4,567,835 | 2/1986 | Reese et al. ......................... 108/7 |
| 4,577,187 | 3/1986 | Barr et al. ........................ 108/94 X |
| 4,637,666 | 1/1987 | Worrell et al. ................. 108/143 X |
| 4,643,547 | 2/1987 | Collins et al. .................. 108/140 X |

FOREIGN PATENT DOCUMENTS 145410 6/1985 European Pat. Off. .
2544269 5/1985 France .
2176095 12/1986 United Kingdom .

Primary Examiner—Kenneth J. Dorner
Assistant Examiner—José V. Chen
Attorney, Agent, or Firm—Varnum, Riddering, Schmidt & Howlett

[57] ABSTRACT

An integrated computer implement work area has a rail typically in a wall panel for supporting an articulating arm and another rail for supporting one or more work surfaces. The articulating arm supports a video display terminal for movement toward and way from the rail as well as vertically with respect to the rail. The arm is also pivotably mounted to the rail. The work surfaces are mounted to another rail for lateral movement therealong and rotation about a vertical axis with respect thereto. One work surface mounts peripheral equipment platforms along a peripheral surface for sliding movement therealong. Concealed wiring chases house communication wiring between a central processing unit mounted in the wall panel and the video display terminal on the articulating arm; between the central processing unit and peripheral equipment, such as a keyboard, and a printer or a disk drive mounted to the peripheral equipment platforms on the work surface. Power cabling is also housed in the concealed wire chases between a source of power and each of the computer components. The work surface can be raised or lowered with respect to the floor for further accommodation of the user.

35 Claims, 13 Drawing Sheets

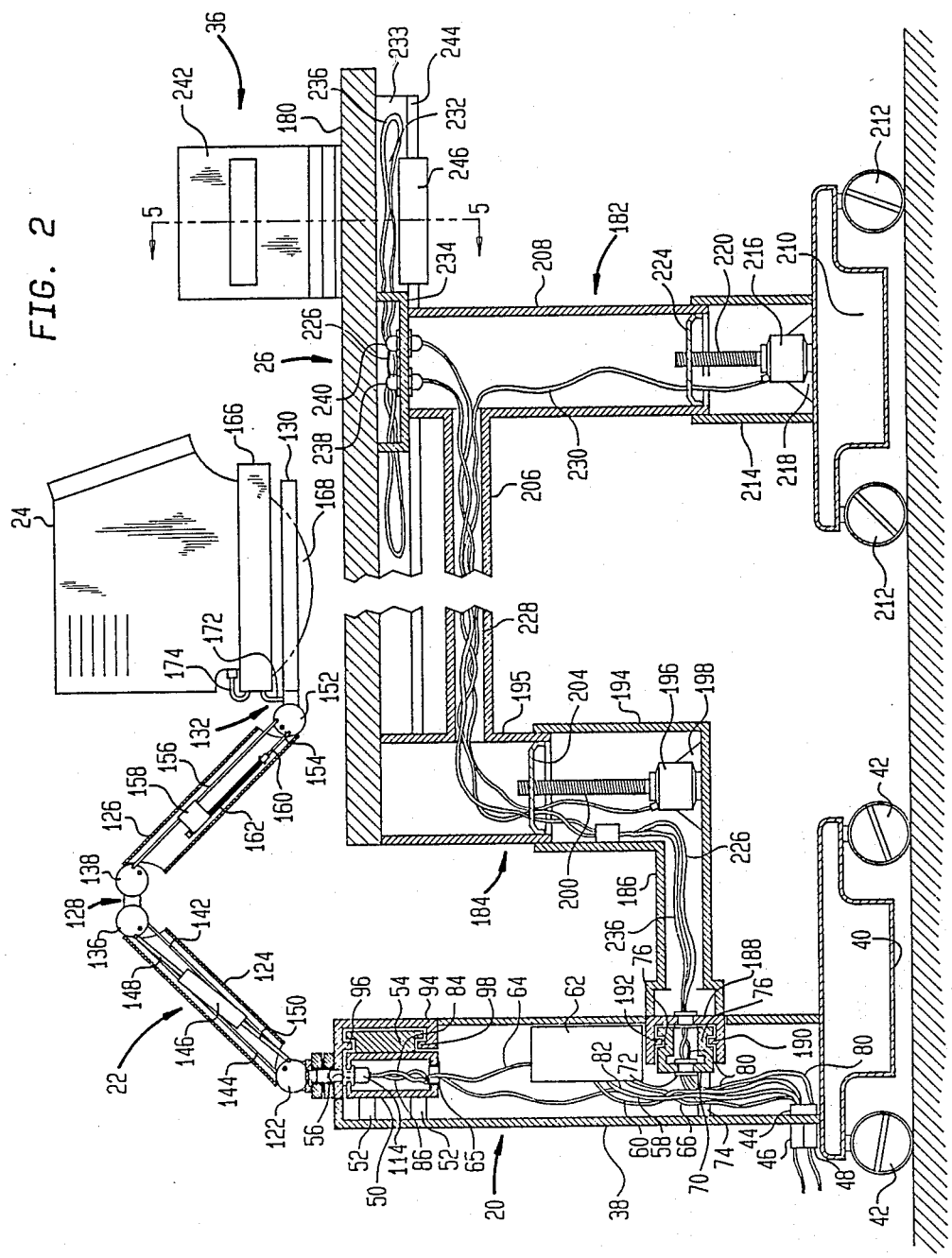

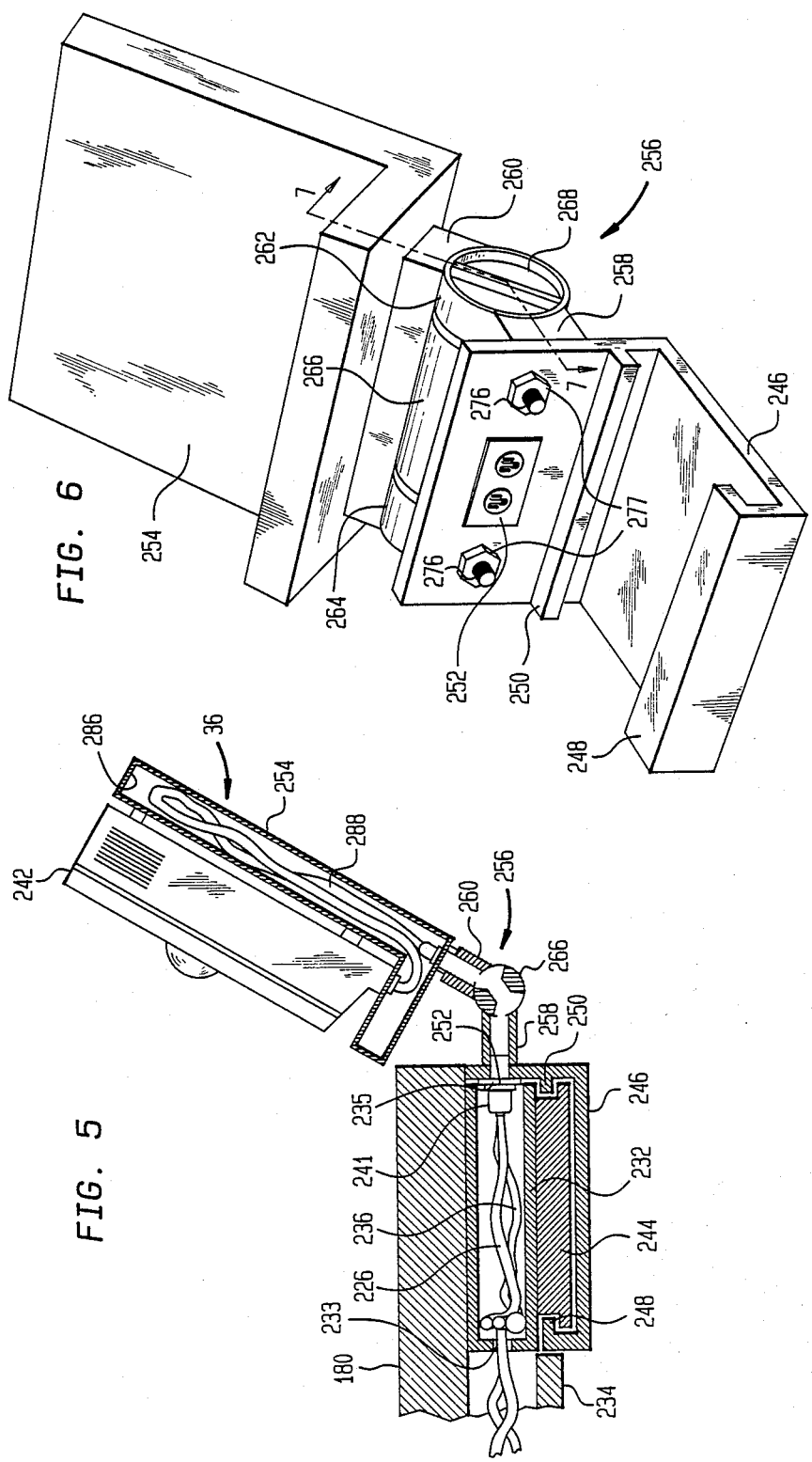

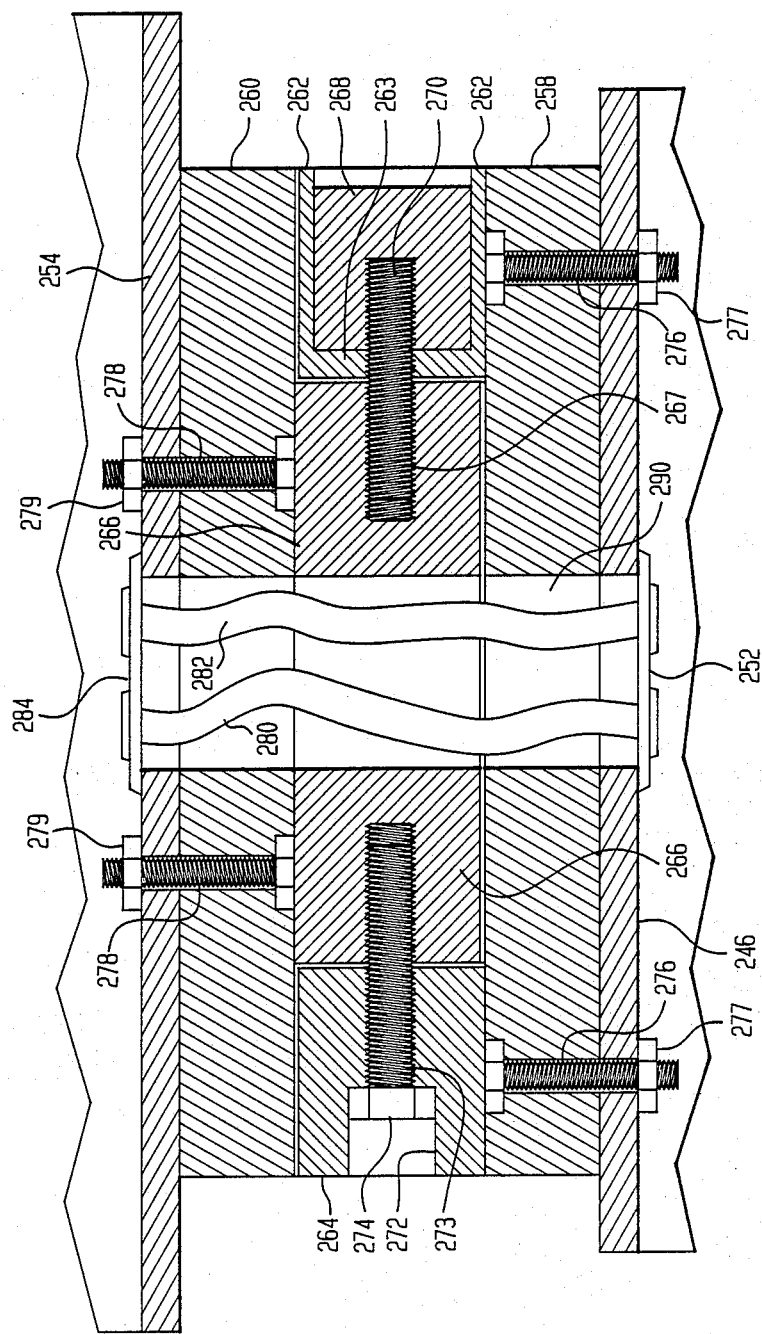

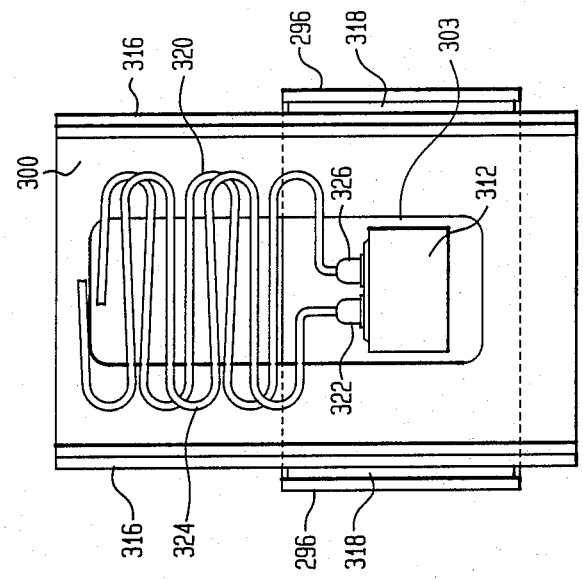
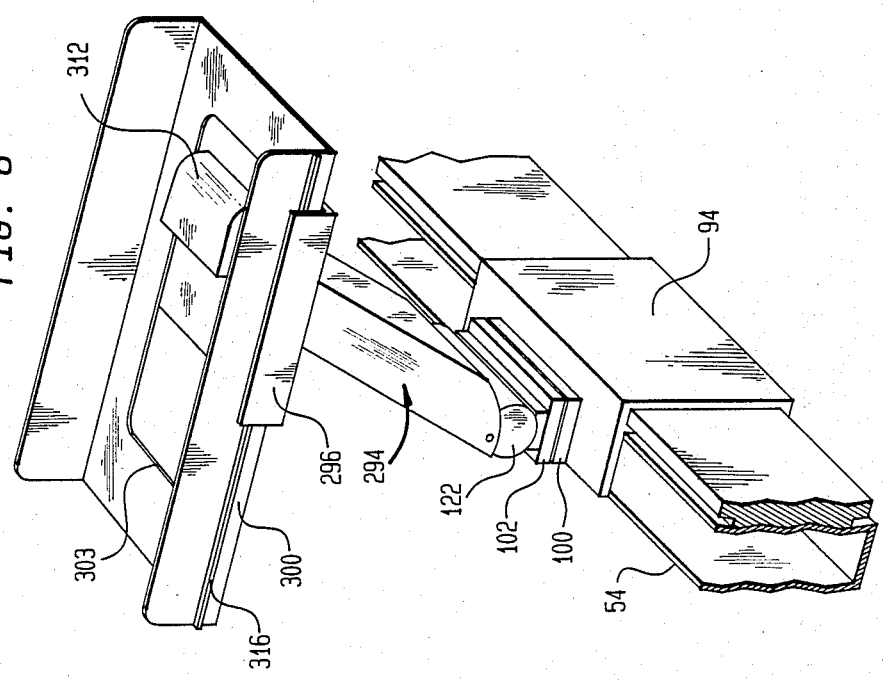

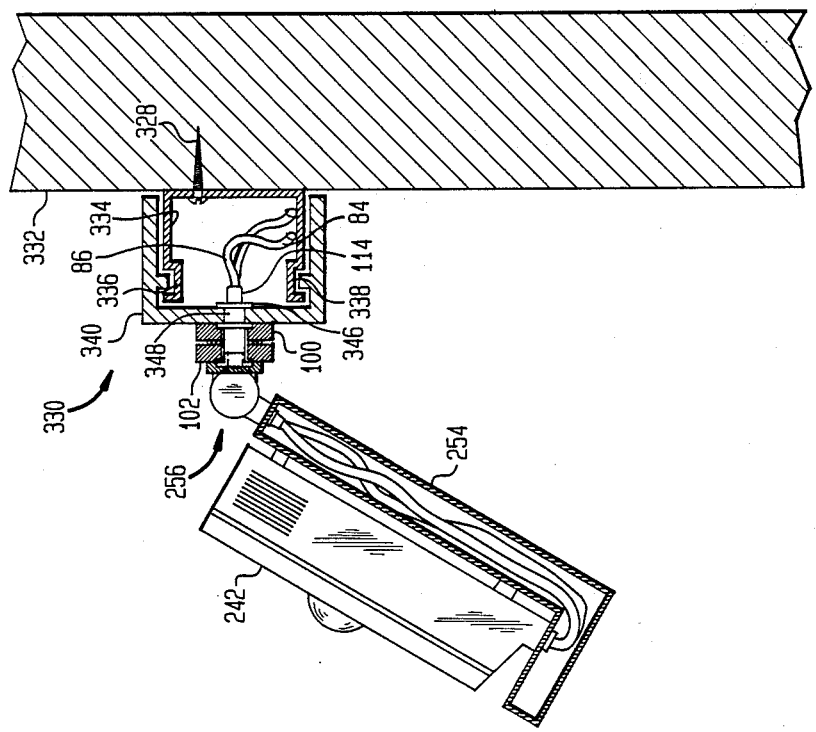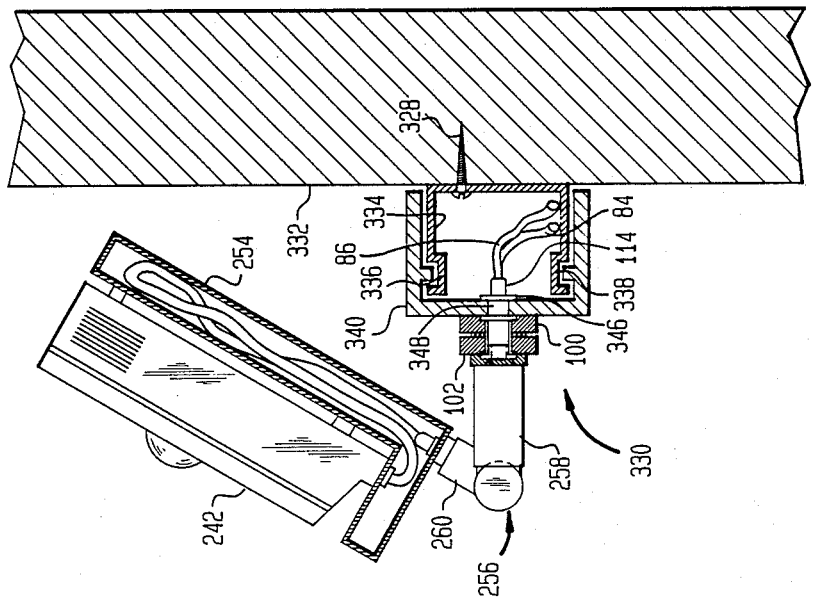

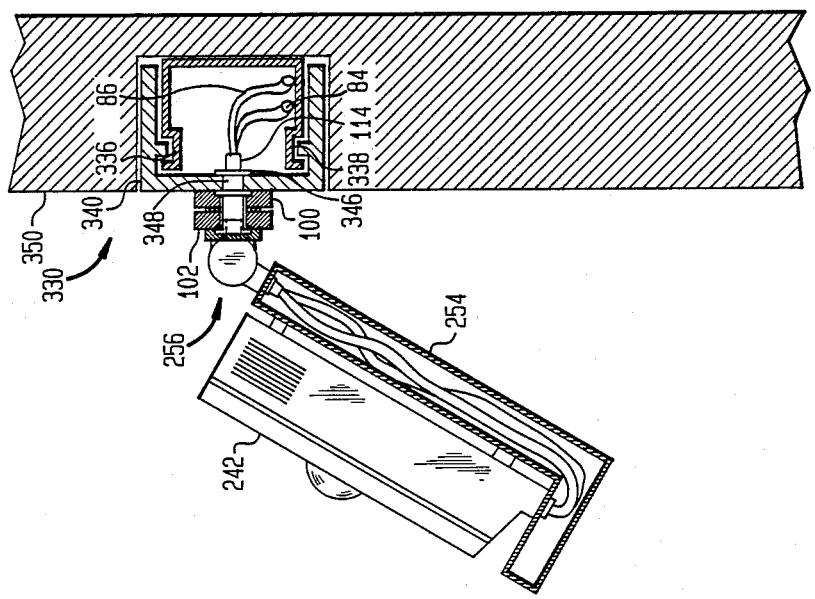

INTEGRATED COMPUTER IMPLEMENT WORK AREA

BACKGROUND OF THE INVENTION

1. Field of the Invention

This invention relates to an integrated computer implement work area. In one of its aspects, the invention relates to a work area furniture and computer implement system in which a computer, video display terminal, keyboard and peripheral equipment are integrated with work surfaces to facilitate the use of the computer and peripheral equipment. In another of its aspects, the invention relates to a work area system for supporting video display terminal equipment for optimum accommodation by the user. In another of its aspects, the invention relates to a work area system in which a computer video display terminal is integrated with work surfaces. In still another of its aspects, the invention relates to a work area system in which computer components are integrated with a work surface.

2. State of the Prior Art

With the increasing use of computer terminals and personal computers in the work place, it is becoming increasingly difficult to accommodate computer equipment, such as a central processing unit, video display terminal, disk drives, keyboards, disk files, as well as the usual papers in a work area. Peripheral equipment clutters up the work area and makes it difficult to arrange work files and accommodate the computer equipment. Further, it is difficult to position a video display terminal and other computer equipment to accommodate the many different work functions in the work environment.

In response to this problem, there has developed computer furniture which is dedicated to the computer and peripheral equipment. Although the computer and peripheral equipment are well accommodated, the furniture is not suitable for other functions which would be performed in the work area. Examples of such dedicated equipment are disclosed in the U.S. Pat. Nos. to Tellier et al 4,365,561, issued Dec. 28, 1982; Wilburth 4,546,708, issued Oct. 15, 1986; Reese et al. 4,567,835, issued Feb. 4, 1986; and Barr et al. 4,577,187, issued Mar. 18, 1986.

SUMMARY OF THE INVENTION

According to the invention, an integrated system for computer implements and work area is provided to accommodate the needs of both computer functions and other functions when needed without interference of one with the other. In one aspect, the invention comprises a vertical wall panel extending from a floor surface and having a rail extending horizontally a spaced distance from the floor at a working height and a computer central processing unit therein. An arm has one end and a video display terminal support at another end thereof. Means mount the arm at one end to the rail for sliding movement therealong. A video display terminal is mounted to the video display terminal support. Electrical communication cabling is provided between the computer central processing unit and the video display terminal.

Preferably, a keyboard is spaced from the wall panel or rail and communication cabling interconnects the computer central processing unit and the keyboard. A work surface having a peripheral edge is mounted to the wall panel for articulating movement with respect thereto. Preferably, the keyboard is mounted to the peripheral platform on the peripheral edge of the work surface for movement therealong. Desirably, a wiring chase is at least partially mounted to the work surface between the wall panel and the peripheral platform for housing communication wiring. The communication cabling between the computer central processing unit and the keyboard is at least partially positioned within the wiring chase. In a preferred embodiment of the invention, means are provided for raising and lowering the height of the work surface with respect to the floor surface. In a preferred embodiment of the invention, the peripheral platform mounting means comprises a rail mounted to the undersurface of the work surface and a trolley mounted to the rail for movement therealong.

The work surface can be mounted to a rail on the wall panel for lateral movement therealong. In addition, the work surface can be mounted for rotation about a vertical axis with respect to the rail or the wall panel.

Further, according to the invention, a work area system for use with computer components comprises a rail mounted in horizontal orientation and spaced from a floor surface at a working height, an arm having one end and a video display terminal support at another end and means for mounting the one end of the arm to the rail for sliding movement therealong. Cable chase means are provided along the arm between the ends thereof for housing electrical and communication wiring. A video display terminal thus mounted on the other end of the arm can be connected to a computer through the cable chase means.

Further according to the invention, a work area system for use with computer components comprises at least one rail mounted in horizontal orientation and one rail is spaced from a floor surface at a working height. An arm has one end and a video display terminal support at another end. Means mount the one end of the arm to the one rail for sliding movement therealong. A work surface has a peripheral edge. Means mount the work surface to the one or another of the rails for articulating movement with respect thereto.

Still further according to the invention, a work area system for use with computer components comprises a work surface supported above a floor surface and having a peripheral edge. A rail is mounted to the peripheral edge of the work surface. At least one peripheral platform is adapted to support the peripheral computer equipment such as a keyboard or a printer. Means mount the or each peripheral platform to the peripheral edge of the work surface for sliding movement therealong. A wiring chase means is mounted beneath the work surface for guiding electrical cabling from a computer to a source of electrical energy to the or each peripheral platform. In this manner, computer peripheral equipment mounted on the or each peripheral platform can be connected to a computer through the wiring chase means. The peripheral equipment can be selectively positioned along the peripheral edge of the work surface for use as required.

Preferably, the arm for the video display terminal includes means for moving the video display terminal toward and away from the wall panel or the rail and further has means for raising and lowering the video display terminal with respect to the floor surface. Further, the mounting means for the arm desirably comprises means for pivotably mounting the one end of the arm to the wall panel or rail. The rail can be mounted to the top portion of a wall panel, to an outside surface of the wall panel, or within a wall panel between a top and bottom portion thereof.

The invention provides a system whereby computer components such as a video display terminal can be accommodated at any particular orientation with respect to the user when it is desired for use and can be moved away from the work area when the computer is not in use. Further, peripheral equipment is provided on the work surface for use by the user as desired in any given position suitable to the user and the equipment can be moved aside easily when not in use. The articulation of the work surface provides for maximum flexibility and accommodation of the user work habits throughout a multitude of functions performed by the user.

BRIEF DESCRIPTION OF THE DRAWINGS

The invention will now be described with reference to the accompanying drawings in which:

FIG. 2 is a side elevational view of one work surface and control panel module shown in FIG. 1 taken along lines 2—2 of FIG. 1;

FIG. 5 is a side elevational view in section of a connection between a work surface rail and a peripheral trolley assembly shown in FIG. 1;

FIG. 6 is a perspective view of a peripheral trolley assembly illustrated in FIG. 1;

FIG. 7 is a partial sectional view taken along lines 7—7 of FIG. 6;

FIG. 8 is a perspective view of an articulating arm illustrating a second embodiment of the invention;

FIG. 10 is a plan view of the articulating arm platform taken along lines 10—10 of FIG. 9;

FIG. 15 is a side elevational view of the mounting of a peripheral support arm to a wall-mounted rail;

FIG. 16 is a side elevational view of another means for mounting a peripheral support arm to a wall-mounted rail; and FIG. 17 is a side elevational view of an alternate mounting of a peripheral support assembly within a wall or panel system.

DETAILED DESCRIPTION OF THE DRAWINGS

Figure 1:
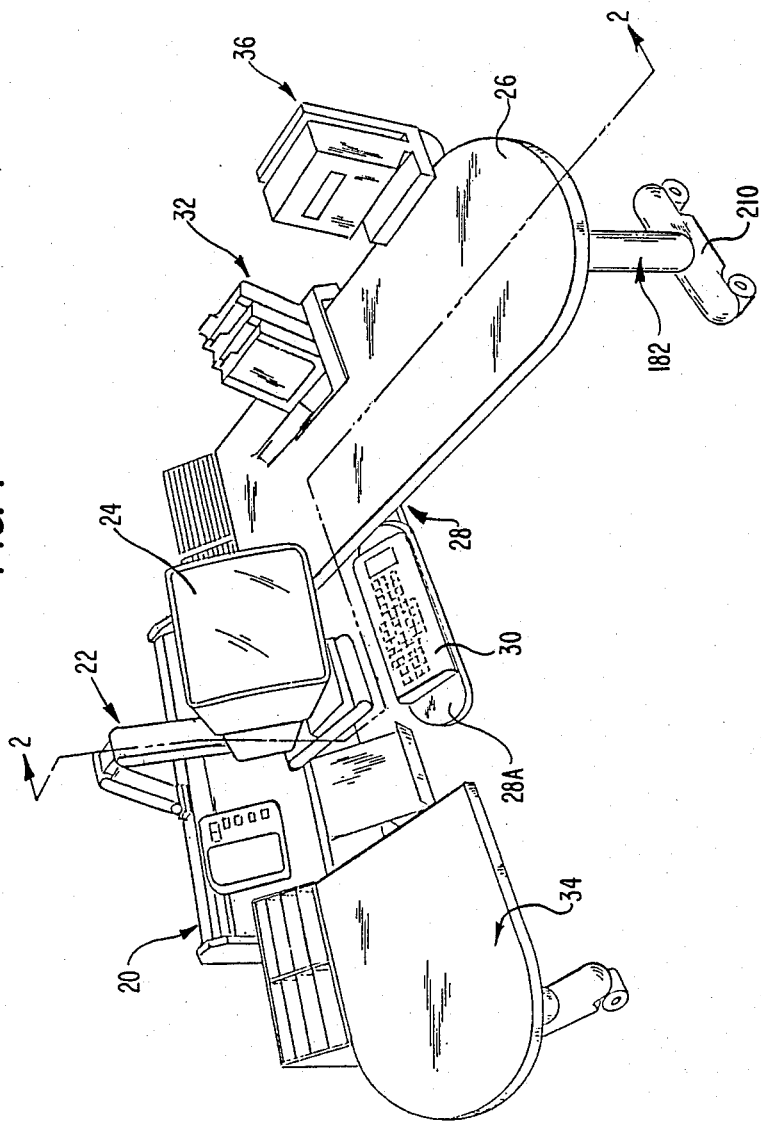
FIG. 1 is a perspective view of an integrated computer support and work system according to the invention.

Referring to the drawings and to FIG. 1 in particular, there is shown a perspective view of an integrated computer equipment and work surface system according to the invention. This system comprises a vertical hardware/support wall panel 20 which mounts an articulating arm 22 having a video display terminal (VDT) 24 mounted at one end thereof for articulating movement toward and away from the support panel 20, upwardly and downwardly with respect thereto and laterally with respect thereto. A mobile work surface 26 is supported at one end by the hardware/support panel 20 for articulating movement with respect thereto and and mounts a peripheral equipment rail trolley 28 having a peripheral platform 28A which supports, for example, a keyboard 30. An accessory trolley 32 and a peripheral platform 36 are also mounted to the work surface for movement about an peripheral edge of the work surface. A second mobile work surface 34 is also mounted at one end to the hardware/support panel 20 for articulating movement with respect thereto.

Figure 4:
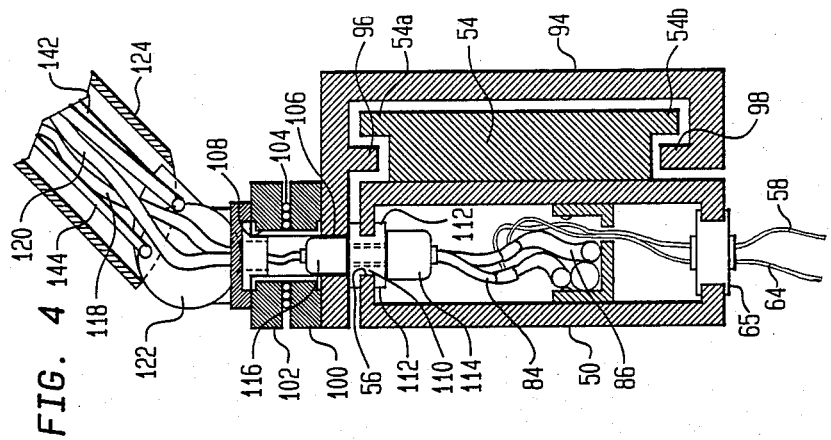
FIG. 4 is an enlarged side elevational view of an upper portion of a panel module and articulating arm showing communications between the arm and the rail.

Referring now to FIGS. 1, 2 and 4, the hardware/support panel 20 comprises an elongated frame 38 which is rectangular in cross-section. A base 40 having wheels 42 supports the frame 38 for movement along a floor surface as desired. A power/communication receptacle 44 is provided at the bottom of the frame 38 and receives a power cable 46 and a communication cable 48. An upper cable chase 00 is mounted to an upper portion of the frame through supports 52. An arm rail 54 is mounted securely to the upper cable chase 50 in a horizontal orientation at a working height above the floor surface and has an upper ear 54a and a lower ear 54b. A slotted opening 56 is provided in the upper portion of the upper cable chase 50. Power cabling 58 is provided between the upper cable chase 50 and the power cable 46. Communication cabling 60 is provided between the communication cable 48 and a computer central processing unit 62.

The computer central processing unit (CPU) 62, configured in a relatively flat shape, can be mounted within a central portion of the frame 38. The computer CPU 62 can be provided with electrical power through wires 66 from the power/communication receptacle 44. Communication cabling 64 can be provided between the computer CPU 62 and the upper cable chase 50. A grommet 65 is provided in an opening in the bottom of the upper cable chase 50 to guide the power and communication wiring therethrough.

A lower rail 70 is securely mounted to the frame 38 through supports 74. A grommet 72 is provided at the back of the lower rail 70 to guide communication and power wiring into the lower rail 70. The rail 70 has an elongated U-shape and has grooves 76 extending along the legs thereof. An electrical cable 80 supplies power to the lower rail 70 from the power cable 46. A communication cable 82 extends between the lower rail 70 and the computer CPU 62.

Figure 3:
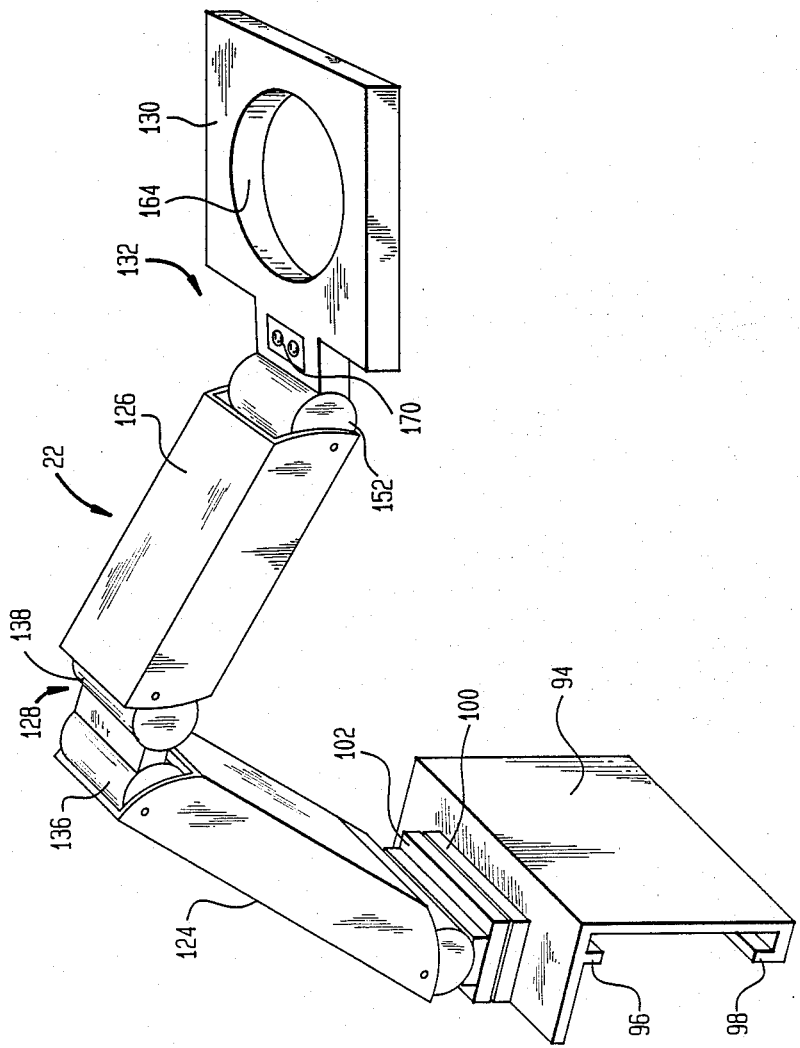
FIG. 3 is a perspective view of an articulating arm subassembly shown in FIGS. 1 and 2.

Referring now to FIGS. 2, 3 and 4, the articulating arm 22 has a trolley 94 which includes a rail-engaging portion which is formed from rail-engaging flanges 96 and 98. The trolley 94 is adapted to slide along the arm rail 54 as desired. Ball bearings (not shown) can be provided between the trolley and the rail to facilitate movement between the two. A lower base 100 is fixed to the trolley 94 and pivotably mounts a swivel base 102 through bearings 104. The articulating arm 22 is thus pivotably mounted to the rail 54 through the trolley 94 for rotation about a vertical axis. A central bore 106 is provided within the lower base 100 in communication with the slotted opening 56 of the upper cable chase 50. A central bore 108 is provided in the swivel base 102 in registry with the central bore 106 of the lower base 100. A connector glide 110 having glide flanges 112 is mounted for sliding movement along the slotted opening 56 in the upper cable chase 50. A connector 114 is connected to the power cable 84 and to the communication cable 86 to pass the electrical current and signals passing through these cables through the connector glide 110 and to a connector 116 mounted in the slotted opening 56 of the upper cable chase 50. A power cable 118 and a communication cable 120 are connected to the connector 116 and pass electrical current and signals through the interior of the articulating arms to the video display terminal 24.

A cylindrical pivot 122 is secured to the top of the swivel base 102 and mounts an inner arm link 124 for pivotable movement about a horizontal axis of the cylindrical pivot 122. An outer arm link 126 is pivotably mounted to the outer end of the inner arm link 124 through a pivotable connection 128. A terminal support 130 is pivotably mounted to the outer end of the outer arm link 126 through a pivotable connection 132.

The pivotable connection 128 comprises cylindrical pivots 136 and 138. Parallel links 142 and 144 are pivotably secured to the cylindrical pivot 122 and to the cylindrical pivot 136 for guided movement of the inner arm link 124 about the cylindrical pivot 122. A pneumatic cylinder 146 having a first linkage 148 connected to the cylindrical pivot 136 and a second linkage 150 secured to the cylindrical pivot 122 frictionally retards the movement of the inner arm link so that it can be manually positioned in any relative position and maintained in the desired position by the frictional force in the pneumatic cylinder 146.

The connections between the outer arm link 126 and the pivotable connections 128 and 132 function in a similar manner. Thus, a cylindrical pivot 152 is provided on the terminal support 130 and mounts the outer arm link 126. The linkages between the cylindrical pivots 138 and 152 can be the same as between the pivots 136 and 122. Alternatively, the pivots can comprise a standard mechanism manufactured by Dectron Corporation and sold under the mark PROP ARM. This device comprises a linkage 156 secured to the cylindrical pivots 138 and 152, a friction glide 158 which slides along the linkage 156, a support link 160 and a coil compression spring 162.

A VDT (video, display terminal) platform 166 mounts the VDT 24 and has a depending spherical mount 168 which fits within a circular opening 164 of the terminal support 130. The video display terminal thus can universally rotate within the terminal support 130 for universal adjustment of the terminal screen for the convenience of the user. A socket 170 is provided in the upper face of the terminal support 130 for connecting communication and power wires to the video display terminal 24. This wiring can be connected directly between the sockets 170 and the video display terminal, or can be connected to the terminal 24 through connections in the VDT platform 166 as illustrated in FIG. 2. For example, electrical wiring 172 is shown between the socket 170 and the platform 166 and electrical wiring 174 is shown between the platform 166 and the VDT 24.

As will be evident from the foregoing, electrical power is supplied to the VDT 24 through the power cable 46, through the receptacle 44, through the power cable 58, through power cable 84, through connector 114, through power cable 118, through socket 170 and through wiring 172 and 174. Although not shown, the power cable 118 as well as the communication cable 120 extends continuously through the inner arm link 124 and the outer arm link 126 and connects to the socket 170. In a similar manner, communication cabling is connected to the terminal 24 from the computer CPU 62, communication cabling 64, communication cable 86, connector 116, communication cable 120, socket 170, electrical wiring 172 and electrical wiring 174.

The inner arm link 124 and the outer arm link 126 are adapted to support the VDT 24 for movement horizontally toward and away from the frame 38 as well as vertically with respect thereto. The mechanics of the inner and out arm links 124 and 126, respectively, are designed to maintain the terminal in an adjusted position but to be easily movable for adjustments to new positions. Further, the spherical mounting of the platform 166 on the terminal support 130 permits universal angular adjustment of the terminal 24 with respect to the platform 130. Still further, the swivel mounting of the articulating arm on the trolley 94 permits rotational movement of the articulating arm 22 about a vertical axis of the trolley 28 for further adjustment of the terminal 24 with respect to the user. Still further, the trolley 94 is slidable in a horizontal direction parallel to the surface of the frame 38 for lateral adjustment of the VDT with respect to the frame and thus with respect to the user. To this end, the links of the power cable 84 and the communication cable 86 are sufficiently long to enable the trolley to slide from one end to the other of the rail 54 without interference or otherwise disconnecting the electrical and communication cables. The mounting of the articulating arm 22 on the hardware/support panel 20 with the myriad of adjustable supports provides tremendous flexibility for positioning the video display terminal 24 in any convenient location to the user. Thus, the terminal can be moved easily from side to side, can be moved out of the way temporarily, can be positioned above or below the work surfaces or can be positioned directly adjacent to the hardware/support panel 20. This arrangement gives the user of the terminal complete flexibility in the use of the terminal or the option to position it out of the way when it is not used.

Referring again to FIG. 2, the mobile work surface assembly 26 has a work surface 180 supported at an outer end by an outer support leg assembly 182 and at an inner end by an articulating cantilevered leg assembly 184. The articulated cantilevered leg assembly 184 comprises a hollow cantilever arm 186 which is mounted to the lower rail 70 through a U-shaped trolley 188 having rail-engaging flanges 190 and 192. As seen in FIG. 2, the rail-engaging flanges 190 and 192 embrace upper and lower grooves 76 on the rail 70 so that the trolley 188 slides along the rail 70 to position the articulating cantilevered leg 184 at various positions along the hardware/support panel 20.

A telescoping tube 194 is mounted in vertical orientation on the outer end of the cantilever arm 186 and receives vertical support tube 195 which is mounted to the undersurface of the work surface 180. A reversible motor 196 is mounted at the bottom of the telescoping tube 194 on motor mount 198. The motor 196 is drivingly connected to a threaded rod 200 which is threaded into a plate 204 secured to the inner side walls of the vertical support tube 195. The plate 204 has a threaded bore which threadably engages the threaded rod 200 so that the support tube 195 is supported by the threaded rod 200 through the plate 204. Rotation of the threaded rod 200 by the motor 196 will drive the plate upwardly or downwardly, depending on the direction of rotation of the motor, along the threaded rod 200. Movement of the plate 204 along the threaded rod 200 will cause a height change in the telescoping relationship between the telescoping tube 194 and the vertical support tube 195. The mounting of the vertical support tube 195 in telescoping relationship to the telescoping tube 194 and on the threaded rod 200 permits rotation of the vertical support tube 195 with respect to the telescoping tube 194 about a vertical axis. To this end, the profiles of the vertical support tube 195 and the telescoping tube 194 must be circular in cross section, at least at the interface between the two tubes.

A horizontal channel 206 extends from the vertical support tube 195 to the outer support leg assembly 182 to establish communication therebetween. The outer support leg assembly 182 comprises a vertical tube 208, a base 210 which is mounted on wheels 212 and a telescoping tube 214 which receives the vertical tube 208. A vertical height adjustment mechanism is provided in the outer support leg assembly 182 in much the same fashion as the vertical height adjustment in the articulating cantilevered leg 184. Thus, a reversible motor 216 is mounted on a motor mount 218 in the bottom of telescoping tube 214. The motor 216 drivingly engages a threaded rod 220 which in turn is threaded into a threaded hole in a mounting plate 224. The mounting plate 224 is secured to the inside surface of the vertical tube 208. Rotation of the threaded rod 220 will drive the plate 224 vertically therealong to thereby change the telescoping relationship between the vertical tube 208 and the telescoping tube 214. The motors 216 and 196 are synchronized for driving the threaded rods 220 and 200, respectively, in the same direction and at the same speed so that the driving of the motors will raise or lower the work surface 180 evenly with respect to the floor surface, depending on the direction of rotation of the threaded rods 220, 200.

Electrical energy is supplied to the motors 196 and 216 through electrical cable 226 and electrical wires 228 and 230. The electrical cable 226 is connected to the electrical cable 80 in the lower rail 70 through a suitable connector.

Referring to FIGS. 2, 5, 6 and 7, a U-shaped peripheral rail 232 is mounted to the undersurface of the work surface 180 near a peripheral edge thereof. This peripheral rail 232 extends along the two opposite sides of the work surface to mount peripheral equipment rail trolleys 28, accessory trolleys 32 and peripheral platforms 36. A cable chase 234 is mounted to the undersurface of the work surface 180 and extends between the vertical tube 208 and the peripheral chase 232. Openings 233 are provided in the chase 232 in registry with the cable chase 234 to provide open communication therebetween for passage of communication cabling 236 and electrical cables 226 therethrough. Connectors 238 and 240 are provided between the cable chase 234 and the vertical tube 208 to connect the electrical cable 226 and communication cable 236 between the horizontal channel 206 and the cable chase 234. Thus, the communication and electrical cabling can extend from the lower cable chase 70, through the articulating cantilevered leg 184, through the upper portion of the outer support leg assembly 182 and to the interior of the peripheral chase 232. Various computer peripheral equipment, such as a printer 242, disc drive or keyboard can be mounted on the peripheral platform 36 and connected electrically to the power and communication wiring within the peripheral chase 232 in a manner which will be described hereinafter. The connections between the keyboard 30 and the computer CPU 62 are identical. For purposes of brevity, those connections will not be repeated herein.

The connection between the printer 242 (or other peripheral equipment) and the cable chase 234 will now be described with reference to FIGS. 5, 6 and 7. A rail 244 having laterally-projecting ears is securely mounted to the underside of the peripheral chase 232. A trolley 246 having rail-engaging flanges 248 and 250 is mounted for sliding movement along the rail 244. A receptacle 252 for electrical and communication wiring is mounted to the trolley 246 in communication with an open end in the cable chase 234. Connectors 241 connect the electrical cable 226 and the communication cable 236 to the receptacle 252 through the open end in the cable chase 234. The portions of the cables 266 and 236 positioned within the peripheral chase 232 are sufficiently long to allow the peripheral platform to slide along the peripheral rail 244 without losing the connections between the platform and the cabling.

An L-shaped peripheral platform 254 is connected to the trolley 246 through a peripheral support joint 256 which permits rotation of the platform 254 with respect to the trolley 246 about a horizontal axis. The support joint 256 comprises a connector 258 rigidly joined to the trolley 246, a connector 260 rigidly joined to the platform 254, cylindrical joint members 262 and 264 rigidly joined to the connector 258 and a cylindrical sleeve 266 rigidly joined to the connector 260. The cylindrical sleeve 266 is mounted between the cylindrical joint members 262 and 264. A plug handle 268 is rotatably mounted within the cylindrical joint member 262 and bears against an inner shoulder 263 thereof. A threaded rod 270 is nonrotatably secured to the plug handle 268 and is threaded into a threaded bore 267 in the cylindrical sleeve 266. The joint member 264 has an enlarged opening 272 and a bore 273 extending axially therethrough. A bolt 274 is threaded into a tapped hole 275 to adjustably secure the cylindrical joint member 264 to the cylindrical sleeve 266. The cylindrical joint members 262 and 264 are rigidly fixed to connector 258 and to the trolley 246 through bolts 276 and nuts 277. The heads of bolts 276 are preferably welded to the joint members 262 and 264. In like fashion, the cylindrical sleeve 266 is secured to the connector 260 and the platform 254 through bolts 278, welded to the sleeve 266, and nuts 279.

The relative angular relationship between the platform 254 and the trolley 246 is controlled by the plug handle 268. Loosening of the plug handle 268 allows the connector 260 to rotate freely with respect to the connector 258 about the axis of the threaded rod 270. Rotation of the plug handle 268 in a clockwise direction so as to thread the rod into the threaded bore 267 will draw the plug handle 268 tightly into engagement with the cylindrical sleeve 266. Thus, by drawing the plug handle 268 tightly into engagement with the cylindrical sleeve 266, the cylindrical joint members 262, 264 and 262 are locked together, thereby locking the peripheral platform 254 rigidly in adjusted position with respect to the trolley 246.

The connector 258 has a hole 290 in registry with the receptacle 252 for passage of electrical and communication wiring therethrough. In similar manner, the cylindrical sleeve 266 has a slot 291 in registry with the hole 290 and the connector 260 has a hole 292 in registry with the slot 291. A power cable 280 and communication cable 282 extend from receptacle 252 through the hole 290, through the slot 291 and through the hole 292 to a receptacle 284 mounted in the platform 254. In this manner, electrical and communication cabling extend between the cable chase 234 and the peripheral platform 254.

As seen in FIG. 5, the platform 254 can have a hollow cavity 286 to accommodate peripheral equipment cabling 288. The peripheral equipment cable 288 has a plug which plugs into the receptacle 284.

Figure 9:
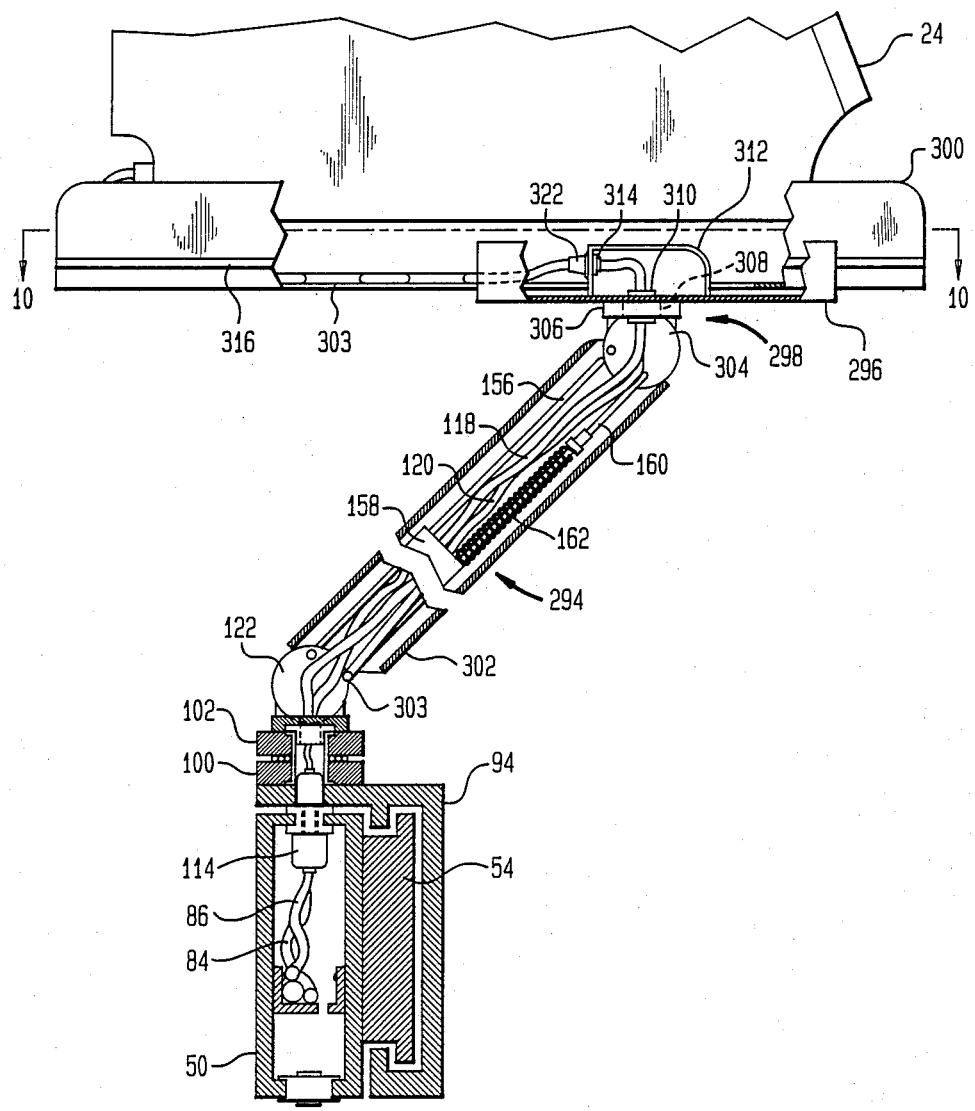
FIG. 9 is an enlarged side elevational view in section of the articulating arm shown in FIG. 8 mounted on a rail.

Referring now to FIGS. 8–10, there is shown an alternate embodiment of the articulating arm structure which controls the displacement of the video display terminal 24. In these drawings, like numerals have been used to designate like parts. In this alternate embodiment, the trolley and rail configuration is identical but the arm and support for the video display terminal 24 are different. In this case, the arm is a single arm instead of two arms and the VDT support is slidable to move the VDT 24 toward and away from the hardware/support panel 20.

A single arm 294 is pivotably mounted on the arm rail 54 through trolley 94 and through the lower base 100 and swivel base 102. The arm 294 is pivotably mounted on the cylindrical pivot 122 at a bottom portion thereof and, at a top portion thereof, pivotably supports a tray 296 through a pivotable coupling 298. A slidable platform 300 is mounted to the tray 296 for sliding movement in a direction to the right and left as viewed in FIG. 9.

The arm 294 comprises an elongated hollow housing 302 which is pivotably mounted at its lower end to the cylindrical pivot 122. A cylindrical mounting member 304 is received within the upper end of the housing 302. A stabilizing mechanism is provided within the housing 302 to maintain the relative position of the arm 294 in a selected position with respect to the cylindrical pivot 122 and the cylindrical pivot 304. This mechanism has been described above with respect to FIG. 2 and briefly includes a link 156 pivotably secured at a bottom end to the cylindrical pivot 122 and pivotably secured at an upper end to the cylindrical pivot 304. A friction glide member 158 is mounted for sliding movement along the link 156 and is mounted for sliding movement also along a support link 160. A compression spring 162 is mounted on the support link 160 which in turn is pivotably mounted at its upper end to the cylindrical mounting member 304. This linkage mechanism is sold by Dectron Corporation of Beverton, Ore.

The cylindrical mounting member 304 is secured to the tray 296 through a connector 306. A vertical hole 308 in connector 306 mounts a grommet 310 for passage of the power cable 118 and the communication cable 120 therethrough. A monument 312 is mounted in the bottom of the tray 296 and mounts a socket 314 which receives the ends of the power and communication cables 118 and 120, respectively.

The slidable platform 300 is mounted to the tray 296 for sliding movement in a similar fashion as drawers are mounted to a cabinet. The slidable platform 300 is lockable, however, in a given position with respect to the tray 296 so that the platform remains in an adjusted position as desired. To this end, a glide member 316 is mounted to each side of the slidable platform 300 and an interengaging glide member 318 is mounted to the inside arms of the tray 296. These glide members can be any conventional drawer glide mechanisms which are well known to those having ordinary skill in the art. The platform 300 has a slot 303 extending along a central portion thereof. A monument 312 projects through slot 303 and moves along the slot 303 as the platform 300 moves with respect to tray 296.

A power wire 320 having a plug 322 is connected to the socket 314 and carries power to the VDT 24. Similarly, a communication wire 324 is connected to the socket 314 through plug 326 and carries communication signals to the VDT. As shown in FIG. 10, the wires 320 and 324 are looped back and forth across the width of the slidable platform 300 to enable the platform 300 to slide freely within the tray 296 without interference from the wires 320 and 324.

In operation, the articulating arm 294 can be pivotably rotated about a horizontal axis through the cylindrical pivot 122 and positioned in a stable position due to the stabilizing mechanism within the arm 294. At the same time, the articulating arm 294 is pivotable about a vertical axis passing through the swivel base 102. As the arm 294 is raised and lowered, the angle of the VDT with respect to a horizontal plane remains constant. Further, the VDT is movable toward and away from the user (and conversely away from and toward the hardware/support panel 20) by moving the slidable platform 300 with respect to the tray 296. Thus, the articulating arm and platform mounting shown on FIGS. 8–10 provide a universal-type of mounting for a VDT with respect to the hardware/support panel 20.

Figure 11:
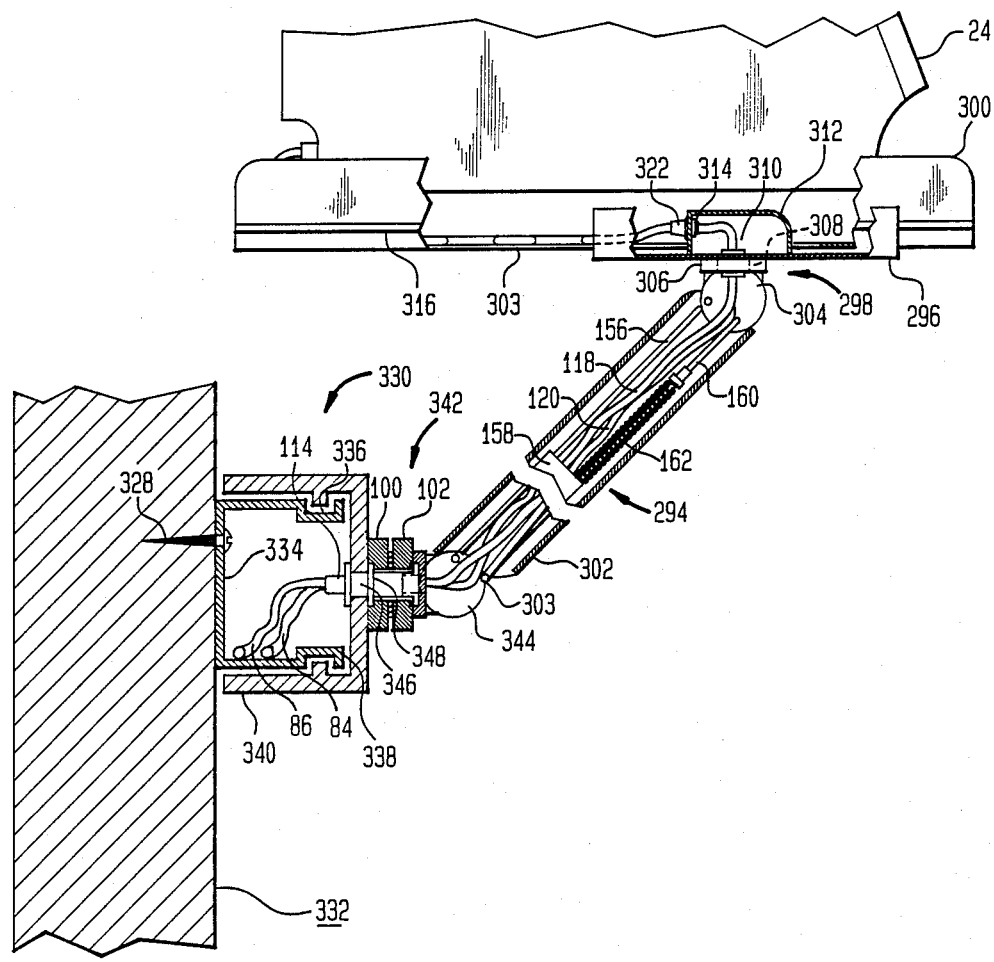
FIG. 11 is a side elevational view showing the mounting of the articulating arm to the face of a panel or wall system.
Figure 12:
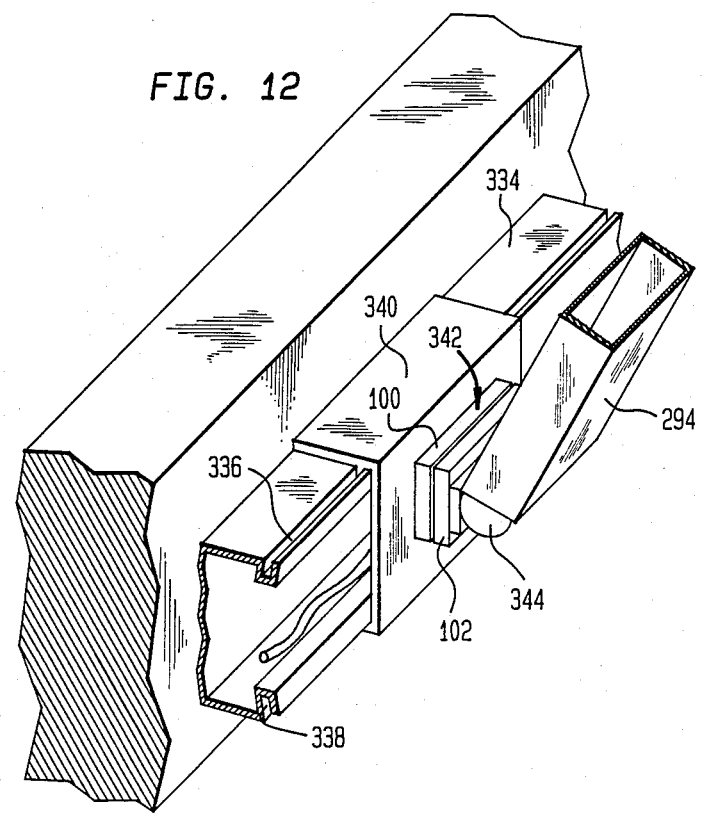
FIG. 12 is a perspective view showing the mounting to a rail of an articulating arm shown in FIG. 11.

Reference is now made to FIGS. 11 and 12 which illustrate an embodiment of the invention in which the articulating arm is mounted to the outside surface of a wall or panel system through a rail similar to the rail used in the hardware/support panel. In these drawings, like numbers have been used to designate like parts.

A VDT rail assembly 330 is securely mounted to a wall or panel system 332 through suitable fastening means. The wall panel can be the type of panel system having vertical hanging intelligence at the side of two- or four-foot wide panels by which a rail can be secured to the panels through clips at the end of the rail. A suitable panel system and clip attachment structure is marketed by Herman Miller, Inc., under the mark ACTION OFFICE. Alternatively, the rail assembly 330 can be secured to the wall panel through suitable screws (not shown).

The VDT rail assembly 330 comprises a conduit rail 334 of generally U-shaped construction having an elongated groove 336 at an upper portion and an elongated groove 338 at a lower portion thereof. A trolley 340 of similar construction to the trolley 188 has rail-engaging flanges and is mounted for sliding movement on the rail 334. A swivel mount 342 similar to the lower base 100 and swivel base 102 is secured to the trolley 340 to permit rotation of the swivel mount 342 with respect to the trolley 340. A cylindrical pivot 344, similar to the cylindrical pivot 122, is secured to the swivel mount 342. An articulating arm 294, identical with the arm 294 shown in FIG. 8–10, is mounted for pivotable movement on the cylindrical pivot 344. A cylindrical pivot 304 pivotably mounted to the upper portion of the articulating arm 294 and in turn mounts a tray 296, a sliding platform 300 (not shown) and a VDT 24. The articulating arm and the VDT platform operate in the same fashion in this embodiment as in the embodiment illustrated in FIGS. 8–10. A grommet 346 having a socket 348 is mounted to the trolley 340 for sliding movement therewith. A power cable 84 and a communication cable 86 connect to the socket through connector 114 to provide electrical communication between the cables 84 and 86 and electrical wiring 118 and 120 in the articulating arm 294.

In operation, the articulating arm 294 can pivot about a horizontal axis through the cylindrical pivot 344 and is also free to slide laterally along the rail 334 on the trolley 340. Thus, a CRT mounted to the sliding platform 300 on the end of the articulating arm 294 has adjustability laterally and vertically as well as toward and away from the wall or panel 332.

Figure 13:
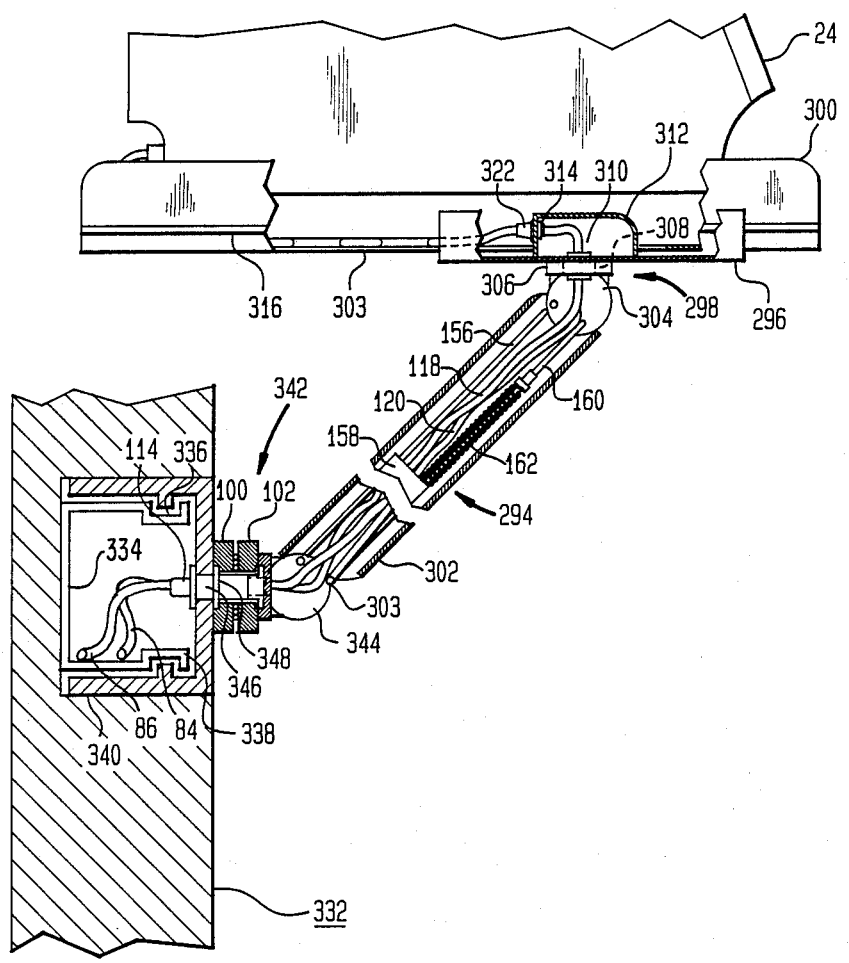
FIG. 13 is a side elevational view showing the mounting of an articulating arm within a wall system.

FIG. 13 illustrates another embodiment of the invention in which the VDT rail assembly 330 is mounted within a wall or panel system 350. Thus, the trolley 340 will slide within the wall system but the articulating arm will have similar capabilities to the articulating arm and rail mounting system illustrated in FIGS. 11 and 12. A suitable wall system in which the rail assembly can be mounted is a wall system sold by Herman Miller, Inc., of Zeeland, Mich., under the mark ETHOSPACE.

Figure 14:
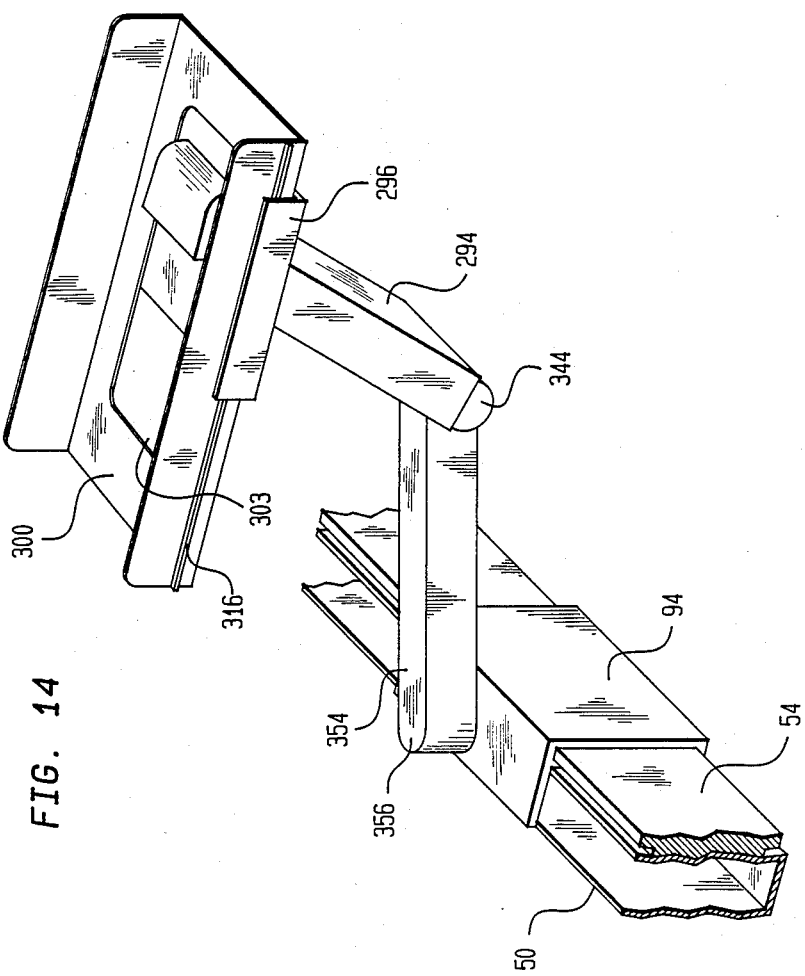
FIG. 14 is a side elevational view of another embodiment of an articulating arm according to the invention.

FIG. 14 shows still another embodiment where a single articulating arm is mounted on a rail through a horizontally swingable arm extension. In FIG. 14, like numerals have been used to designate like parts. An upper cable chase 50 has a trolley 94 mounted thereto through rail 54. A horizontal arm 354 is pivotably mounted to the trolley 94 through a pivot mounting 356. An articulating arm 294 is mounted on the outer end of arm 354 for pivotable movement about a horizontal axis through a cylindrical pivot 344. A tray 296 is mounted to the outer end of the articulating arm 294 in the same fashion as shown in FIGS. 8-10. Electrical wiring (not shown) passes from the upper cable chase 50, through the pivot mounting 356, through the first horizontal arm 354, through the pivot mounting 360, through the second horizontal arm 358, through the cylindrical pivot 344 and through the articulating arm 294 in a manner similar to that described above. The articulating arm can rotate about a horizontal axis whereas the horizontal arm rotates about a vertical axis. At the same time, the trolley 94 is slidable along the rail 54 in the same fashion as described above with respect to FIG. 2.

FIGS. 15, 16 and 17 illustrate three different techniques for mounting an L-shaped peripheral platform 254 to a wall. In these Figures, like numerals have been used to designate like parts.

In FIG. 15, a rail assembly 330 comprises a conduit rail 334 with elongated grooves 336 and 338. A trolley 340 is slidably mounted on the rail 334. An L-shaped peripheral platform 254 is mounted to the peripheral support arm 364 through a peripheral support joint 256 described above with reference to FIGS. 6 and 7. Electrical communication is provided between the conduit rail 334 and the peripheral support arm 364 in the same fashion as described above with reference to FIGS. 11 and 13. Electrical communication between the peripheral support arm 364 and the peripheral platform 254 is provided in the same fashion as described above with reference to FIGS. 5, 6 and 7.

The embodiment shown in FIG. 16 is similar to the embodiment of FIG. 15 in all respects except that the L-shaped platform has a leg of the L at the outer portion of the platform rather than at the inner portion of the platform so that the platform can be oriented downwardly with respect to the support joint 256. Further, the support joint 256 is secured to the trolley 340 through a support block 366 which is somewhat shorter than the peripheral support arm 364. The embodiment is in all other respects identical.

In the embodiment shown in FIG. 17, the structure is identical to that shown in FIG. 16 except that the rail assembly 330 is mounted within a wall system 350 of the same general construction as the wall system of the same number described above with reference to FIG. 13.

The wall 332 which mounts the L-shaped peripheral platform 254 shown in FIGS. 15-17 can be the same wall which mounts the articulating arm 294 and the wall panel 332 shown therein. Further, the rails 334 shown in these drawings can be the same so that the video display terminal and the L-shaped peripheral platform are mounted to the same rail. Alternatively, the rails can be spaced vertically or horizontally from each other so that the video display terminal and the L-shaped peripheral platform are mounted on separate and distinct rails, even though the same number is used to designate the two rails. The video display terminal 24 can be interconnected to a central processing unit (not shown), mounted within the wall, or outside the wall. Similarly, the printer 242 can be connected to a central processing unit (not shown) mounted on a wall 332 in spaced relationship to the VDT rail assembly 330 through the conduit chase 334.

Further, whereas the invention has been described with reference to mounting one or more rails on a wall panel or on a vertical wall, the invention in its broader aspects can be carried out by mounting rails on an open supporting framework, such as disclosed in the U.S. Pat. No. to Burdick 4,382,642, without enclosing the space between the rails.

Reasonable variation and modification are possible within the scope of the foregoing disclosure and drawings without departing from the spirit of the invention which is defined in the appended claims.

The embodiments of the invention in which an exclusive property or privilege is claimed are defined as follows:

1. An integrated computer implement work area system comprising:
    a vertical wall panel mounted on a floor surface;
    a rail mounted to said wall panel and extending horizontally a spaced distance from a floor surface at a working height therefrom; and
    a computer central processing unit mounted within said wall panel;
    an arm having one end and a video display terminal support at another end thereof;
    means for mounting the arm one end to the rail for sliding movement therealong;
    a video display terminal mounted to said video display terminal support;
    cable guide means at least partially within said wall panel for guiding electrical cabling from said computer central processing unit to said video display terminal support when said arm is positioned at any selected location along the rail; and
    electrical communication cabling through said cable guide means between said computer central processing unit and said video display terminal.

2. An integrated computer implement work area system according to claim 1 and further comprising support means spaced from said vertical wall panel; a keyboard mounted on said support means and communication cabling interconnecting the computer central processing unit and the keyboard.

3. An integrated computer implement work area system according to claim 2 end further comprising a work surface having a peripheral edge and means mounting the work surface to the wall panel for articulating movement with respect thereof.

4. An intergrated computer implement work area system according to claim 3 and further comprising a peripheral platform forming said support means; means mounting the peripheral platform to the work surface for movement along the peripheral edge of the work surface; and said keyboard is positioned on said peripheral platform.

5. An integrated computer implement work area system according to claim 4 and further comprising a wiring chase means at least partially mounted to the work surface between the wall panel and the peripheral platform for housing communication wiring; and the communication cabling between the computer central processing unit and the keyboard is at least partially positioned within the wiring chase.

6. An integrated computer implement work area system according to claim 4 and further comprising means for raising and lowering the height of the work surface with respect to the floor surface.

7. An integrated computer implement work area system according to claim 4 wherein the peripheral platform mounting means comprises a rail mounted to the undersurface of the work surface; and trolley means mounted to the rail for movement therealong.

8. An integrated computer implement work area system according to claim 7 and further comprising means to retain the trolley on the rail.

9. An integrated computer implement work area system according to claim 4 wherein the work surface mounting means comprises means for mounting the work surface for lateral movement along the wall panel.

10. An integrated computer implement work area system according to claim 9 wherein the work surface means comprises means for mounting the work surface for rotation about a vertical axis with respect to the wall panel.

11. An integrated computer implement work area system according to claim 10 and further comprising means for raising and lowering the height of the work surface with respect to the floor surface.

12. An integrated computer implement work area system according to claim 4 wherein the work surface mounting means comprises means for mounting the work surface for rotation about a vertical axis with respect to the wall panel.

13. An integrated computer implement work area system according to claim 4 and further comprising a second peripheral platform and means mounting the second peripheral platform to the work surface at the peripheral edge for movement therealong; a printer mounted on the second peripheral platform; and electrical cabling extending between the computer central processing unit and the printer, whereby the printer can be driven by the computer central processing unit.

14. An integrated computer implement work area system according to claim 3 and further comprising means for raising and lowering the height of the work surface with respect to the floor surface.

15. An integrated computer implement work area system according to claim 1 and further comprising a work surface having a peripheral edge; and means mounting the work surface to the wall panel for articulating movement with respect thereto.

16. An integrated computer implement work area system according to claim 15 and further comprising means for raising and lowering the height of said work surface with respect to the floor surface.

17. An integrated computer implement work area system according to claim 15 and further comprising a peripheral platform for supporting computer-driven peripheral equipment such as a printer or keyboard;
    means mounting said peripheral platform to said work surface at said peripheral edge for movement with respect thereto;
    computer peripheral equipment, such as a printer or keyboard, mounted on said peripheral platform; and
    electrical cabling extending between said computer central processing unit and said peripheral equipment, whereby said peripheral equipment can be driven by said computer central processing unit.

18. An integrated computer implement work area system according to claim 15 wherein said work surface mounting means comprises means for mounting the work surface for lateral movement along the wall panel.

19. An integrated computer implement work area system according to claim 18 wherein the work surface mounting means further comprises means for mounting the work surface for rotation about a vertical axis with respect to the wall panel.

20. An integrated computer implement work area system according to claim 15 wherein the work surface mounting means comprises means for mounting the work surface for rotation about a vertical axis with respect to the wall panel.

21. An integrated computer implement work area system according to claim 15 wherein the arm includes means for moving the video display terminal toward and away from the wall panel.

22. An integrated computer implement work area system according to claim 21 wherein the arm further comprises means for raising and lowering the video display terminal with respect to the floor surface.

23. An integrated computer implement work area system according to claim 22 wherein the mounting means for the arm further comprise means for pivotably mounting the one end of the arm to the wall panel.

24. An integrated computer implement work area system according to claim 1 wherein the arm comprises means for moving the video display terminal toward and away from the wall panel.

25. An integrated computer implement work area system according to claim 24 wherein the arm further comprises means for raising and lowering the video display terminal with respect to the floor surface.

26. An integrated computer implement work area system according to claim 25 wherein the means for mounting the one end of the arm to the rail comprises means for pivotably mounting the arm on the wall panel for rotation about a vertical axis.

27. An integrated computer implement work area system according to claim 1 wherein the arm comprises means for raising and lowering the video display terminal with respect to the floor surface.

28. An integrated computer implement work area system according to claim 1 wherein the means for mounting the one end of the arm to the rail comprises means for pivotably mounting the arm to the wall panel for rotation about a vertical axis.

29. An integrated computer implement work area system according to claim 1 wherein the arm has a wiring chase extending therethrough and electrical communication cabling extends through the wiring chase in the arm to the video display terminal.

30. An integrated computer implement work area system according to claim 1 wherein the rail is mounted to a top portion of the wall panel.

31. An integrated computer implement work area system according to claim 1 wherein the rail is mounted to an outside surface of the wall panel.

32. An integrated computer implement work area system according to claim 1 wherein the rail is mounted within the wall panel between a bottom and top portion thereof.

33. An integrated computer implement work area system according to claim 1 and further comprising a second rail mounted to the wall panel; a peripheral platform adapted to mount a computer peripheral unit; means mounting the peripheral platform to the second rail for lateral movement therealong; and communication cabling between the computer central processing unit and the peripheral platform for driving computer peripheral equipment mounted on the peripheral platform.

34. An integrated computer implement work area system according to claim 33 and further comprising a wiring chase between the wall panel and the peripheral platform for housing communication cabling; and the communication cabling extends through the wiring chase.

35. An integrated computer implement work area system according to claim 33 wherein the second rail and the first-mentioned rail are separate from one another and spaced from each other.

* * * * *